United States Patent
Patwardhan et al.

(10) Patent No.: US 10,482,176 B2
(45) Date of Patent: Nov. 19, 2019

(54) SYSTEM AND METHOD FOR QUALITY EVALUATION OF COLLABORATIVE TEXT INPUTS

(71) Applicant: Tata Consultancy Services Limited, Mumbai (IN)

(72) Inventors: Manasi Smarth Patwardhan, Pune (IN); Kanika Kalra, Pune (IN); Mandar Shrikant Kulkarni, Pune (IN); Shirish Subhash Karande, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/920,243

(22) Filed: Mar. 13, 2018

(65) Prior Publication Data

US 2019/0114320 A1 Apr. 18, 2019

(30) Foreign Application Priority Data

Oct. 17, 2017 (IN) .............................. 201721036919

(51) Int. Cl.
*G06F 17/20* (2006.01)
*G06F 17/27* (2006.01)
*G06F 17/24* (2006.01)
*G06N 3/08* (2006.01)
*G06Q 10/06* (2012.01)
*G06F 3/0484* (2013.01)

(52) U.S. Cl.
CPC .......... *G06F 17/2775* (2013.01); *G06F 17/24* (2013.01); *G06N 3/08* (2013.01); *G06Q 10/06395* (2013.01); *G06F 3/0484* (2013.01)

(58) Field of Classification Search
CPC .... G06F 17/2775; G06F 17/24; G06F 3/0484; G06Q 10/06395; G06N 3/08
USPC .......................................................... 704/9
See application file for complete search history.

(56) References Cited

PUBLICATIONS

Kyunghyun Cho et al; "Learning Phrase Representations using RNN Encoder-Decoder for Statistical Machine Translation" Proceedings of the 2014 Conference on Empirical Methods in Natural Language Processing, Oct. 25-29, 2014, pp. 1724-1734, Association for Computational Linguistics, Link: http://emnlp2014.org/papers/pdf/EMNLP2014179.pdf.

(Continued)

*Primary Examiner* — Thierry L Pham
(74) *Attorney, Agent, or Firm* — Finnegan, Henderson, Farabow, Garrett & Dunner LLP

(57) ABSTRACT

This disclosure relates generally to quality evaluation of collaborative text input, and more particularly to system and method for quality evaluation of collaborative text inputs using Long Short Term Memory (LSTM) networks. In one embodiment, the method includes receiving an input data associated with a task to be accomplished collaboratively and sequentially by a plurality of contributors. The input data includes task-wise data sequence of contributor's post-edit submissions. A plurality of features are extracted from the input data. Based on the plurality of features, a plurality of input sequences are constructed. The input sequences include a plurality of concatenated feature vectors, where each of the concatenated feature vectors includes a post-edit feature vector and a contributor representation feature vector. The input sequences are modelled as a LSTM network, where the LSTM network is utilized to train a binary classifier for quality evaluation of the post-edit submission.

19 Claims, 7 Drawing Sheets

(56) References Cited

PUBLICATIONS

Eyke Hullermeier et al. "Label Ranking by Learning Pairwise Preferences Journal Artificial Intelligence" Nov. 2008, pp. 1897-1916, Volume-issue number(s): vol. 172 Issue 16-17, Publisher: ACM, Inc Link: https://www.ke.tu-darmstadt.de/~juffi/publications/aij-08.pdf.

Rakshit Agrawal et al. "Predicting the quality of user contributions via LSTMs Proceeding OpenSym '16 Proceedings of the 12th International Symposium on Open Collaboration" Aug. 17-19, 2016 Publisher: ACM ;Link: http://www.opensym.org/os2016/proceedings-files/p600-agrawal.pdf.

Quang-Vinh Dang et al. "An end-to-end learning solution for assessing the quality of Wikipedia articles" : Proceedings of the 13th International Symposium on Open Collaboration, Aug. 23-25, 2017, Publisher: ACM; Link: https://hal.inria.fr/hal-01559693v2/document.

Meiqun Hu et al. "Measuring Article Quality in Wikipedia: Models and Evaluation" Proceeding CIKM '07 Proceedings of the sixteenth ACM conference on Conference on information and knowledge management, Nov. 6-8, 2007, pp. 243-252, Publisher: ACM Link: http://www.mysmu.edu/phdis2008/meiqun.hu.2008/pub/cikm07p.pdf.

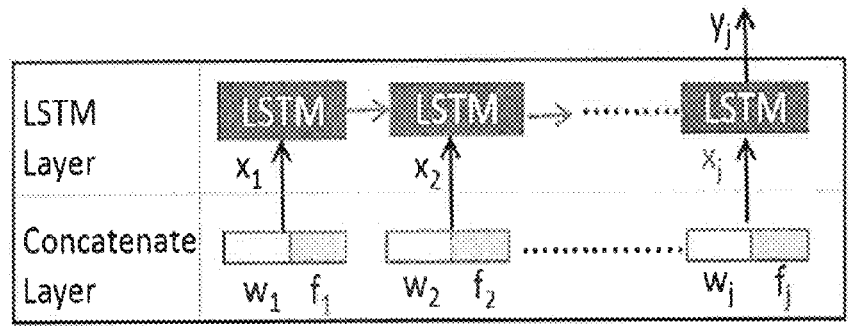
j : Peer-Edit round       $w_j$ : $j^{th}$ worker representation
$x_j$ : $j^{th}$ input feature vector   $f_j$ : $j^{th}$ translation feature vector
$y_j$ : $j^{th}$ label
FIG. 6     ← 600
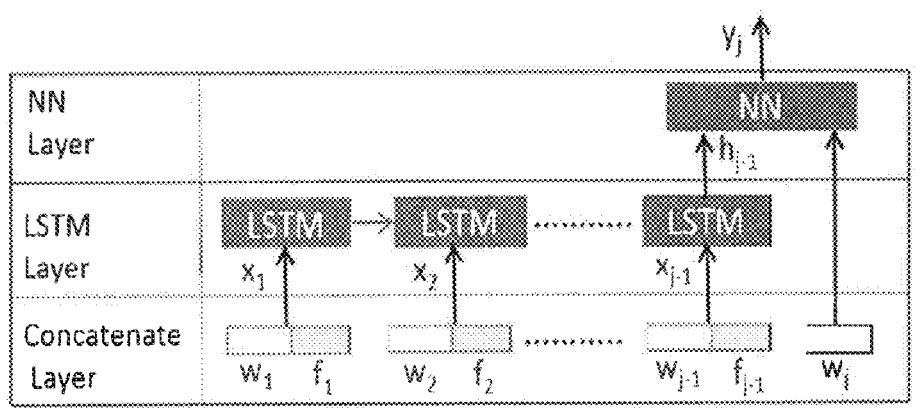
j : Peer-Edit round       $w_j$: $j^{th}$ worker representation
$x_j$ : $j^{th}$ input feature vector   $f_j$ : $j^{th}$ translation feature vector
$y_j$ : $j^{th}$ label            $h_j$ : $j^{th}$ history embedding
← 700
FIG. 7

SYSTEM AND METHOD FOR QUALITY EVALUATION OF COLLABORATIVE TEXT INPUTS

PRIORITY CLAIM

This U.S. patent application claims priority under 35 U.S.C. § 119 to: India Application No. 201721036919, filed on Oct. 17, 2017. The entire contents of the aforementioned application are incorporated herein by reference.

TECHNICAL FIELD

This disclosure relates generally to quality evaluation of collaborative text inputs, and more particularly to system and method for quality evaluation of collaborative text inputs using Long Short Term Memory (LSTM) networks.

BACKGROUND

Crowdsourcing or using crowd having multiple contributors, for providing free-flowing textual annotations, for multiple tasks is a well-established trend in the industry. Examples of such tasks include, but are not limited to, translation, image captioning, content moderation, speech transcription, and so on.

In one approach, "maker-checker" style workflows are incorporated for evaluating the quality of textual annotations. However, such workflows can significantly increase latency and cost associated with the task. In another conventional approach for evaluating the quality of such contributions, automated systems have been utilized. Such automated systems provide promising results for scenarios where the work done by all the contributors is independent of each other. However, such independence of contributions cannot be guaranteed when the workers post-edit a machine input or peer-edit each other's contributions. In another improved approach, rather than enabling the contributors to provide inputs from scratch, the submissions to tasks are first processed by machines, and thereafter output of machine are post-edited or peer-edited by multiple contributors. This approach has the advantage of reducing worker effort and the cost associated with the task.

The inventors here have recognized several technical problems with such conventional systems, as explained below. When workers build upon each other's contributions, accreditation does not remain straightforward, thereby making it even more difficult to identify quality workers and quality edits. Moreover, existing approaches for determining submission and/or worker quality, do not model the dependence of the post-edit quality on prior contributions, especially in iterative peer-editing scenario.

SUMMARY

Embodiments of the present disclosure present technological improvements as solutions to one or more of the above-mentioned technical problems recognized by the inventors in conventional systems. For example, in one embodiment, a processor implemented method for quality evaluation of collaborative text input is provided. The method includes receiving, via one or more hardware processors, an input data associated with a task to be accomplished collaboratively and sequentially by a plurality of contributors. The input data includes task-wise data sequence of contributor's post-edit submissions. Further, the method includes extracting a plurality of features from the input data, via the one or more hardware processors. Furthermore, the method includes constructing, via the one or more hardware processors, a plurality of binary input sequences based on the plurality of features. The binary input sequence includes a plurality of concatenated feature vectors, each of the concatenated feature vectors comprising a post-edit feature vector and a contributor representation feature vector. Also, the method includes modelling, via the one or more hardware processors, the binary input sequences as a LSTM network, wherein the LSTM network is utilized to train a first binary classifier for quality evaluation of the post-edit submission.

In another embodiment, a system for quality evaluation of collaborative text input is provided. The system includes at least one memory storing instructions; and one or more hardware processors coupled to said at least one memory. The one or more hardware processors are configured by said instructions to receive an input data associated with a task to be accomplished collaboratively and sequentially by a plurality of contributors. The input data includes task-wise data sequence of contributor's post-edit submissions. Further, the one or more hardware processors are configured by said instructions to extract a plurality of features from the input data. Furthermore, the one or more hardware processors are configured by said instructions to construct a plurality of input sequences based on the plurality of features. The input sequence includes a plurality of concatenated feature vectors, each of the concatenated feature vectors includes a post-edit feature vector and a contributor representation feature vector. Also, the one or more hardware processors are configured by said instructions to model the input sequences as a LSTM network, wherein the LSTM network is utilized to train a first binary classifier for quality evaluation of the post-edit submission In yet another embodiment, a non-transitory computer-readable medium having embodied thereon a computer program for executing a method for quality evaluation of collaborative text input is provided. The method includes receiving an input data associated with a task to be accomplished collaboratively and sequentially by a plurality of contributors. The input data includes task-wise data sequence of contributor's post-edit submissions. Further, the method includes extracting a plurality of features from the input data. Furthermore, the method includes constructing a plurality of input sequences based on the plurality of features. The input sequence includes a plurality of concatenated feature vectors, each of the concatenated feature vectors comprising a post-edit feature vector and a contributor representation feature vector. Also, the method includes modelling the input sequences as a LSTM network, wherein the LSTM network is utilized to train a first binary classifier for quality evaluation of the post-edit submission.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 illustrates example LSTM architecture for evaluating quality of a post-edit submission made by a worker according to some embodiments of the present disclosure.

FIG. 7 illustrates example LSTM-NN architecture for training a binary classifier to predict probability of a worker improving upon the prior submissions according to some embodiments of the present disclosure.

DETAILED DESCRIPTION

Figure 1:
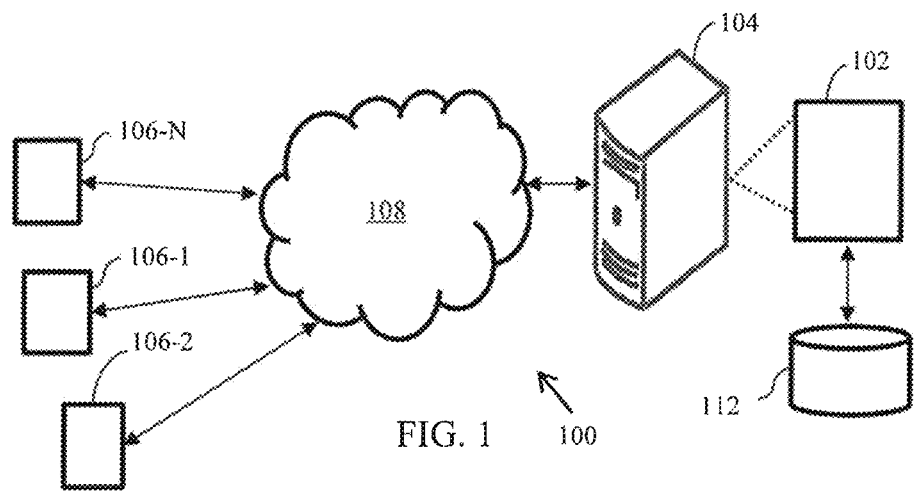
FIG. 1 illustrates networking environment implementing a system for quality evaluation of collaborative text inputs according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

With recent technological improvements and growing demand for crowdsourced solutions, text editing field has witnessed various changes. The contributors from the crowd provides for post-editing machine submissions (hereinafter referred to as 'post-editing') and/or peer-editing other worker's contributions (hereinafter referred to as 'peer-editing'). In such editing scenarios, workers build upon each other's contributions or on posted-edited machine submissions, and hence it is difficult to identify accreditation, thereby making it even more difficult to identify quality workers and quality edits. Conventional techniques for determining quality of submissions and/or worker quality do not model the dependence of the post-edit quality on prior contributions, especially in iterative peer-editing scenario. However, it will be noted that when workers perform post-editing of a machine input or peer-editing of prior contributions, the quality of output received therefrom is not only a function of the properties of that input and the quality of worker submitting it; but also depends upon the quality of prior machine or human input selected for revision.

Various embodiments disclosed herein provides method and system for identifying quality of submissions (or textual inputs), and crowd workers providing said submissions (or edits), where the work done by all the contributors is dependent on each other. In an embodiment, a system models an editing scenario as a sequence of feature vectors of series of post-edit submissions to be provided as an input to a recurrent neural architecture (RNN) and Long short term memory (LSTM), with its output demonstrating the improvement (by assigning rank) of the given submission/input. Said model design ensures that the predicted class label/rank not only takes the characteristics of the current submission and worker in to account; but also takes the characteristics of prior submissions and workers providing those submissions into consideration for prediction, in the order of the post-edits. The disclosed system utilizes a supervised machine learning approach where the model is trained with a subset of post-edit sequences annotated by an expert to train the recurrent neural architecture, which is further used to predict the quality of unseen post-edit data for the same job. Herein, the term 'worker' refers to the contributors from the crowd who would provide post-edit submissions for given task. Accordingly, the terms 'worker' and 'contributor' are construed to have similar meaning, and thus will be used interchangeably throughout the description.

In an embodiment, the system includes an encoder-decoder architecture that is capable of giving output to determine best submission out of the available sequences given by a human, based on a sequence of post-edit human submissions and ranks the submissions. Herein, the input to the encoder-decoder architecture may include features derived from sequence of submissions, and users characteristics of corresponding users providing those submissions. Further, the output of the encoder-decoder architecture includes a sequence of labels assigned to the post-edited submissions, wherein said label assigned to a post-edited submission is indicative of whether said submission is improved over the history of submission or not. Thus, the post-edit ranking problem is modelled using the encoder-decoder architecture. An important contribution of the disclosed embodiments is to effectively model a collaborative editing system using a recurrent neural network architecture that is capable of modelling such collaborative dependencies in rank calculations. A detailed description of the above described system for quality evaluation of collaborative text inputs is shown with respect to illustrations represented with reference to FIGS. 1 through 9.

The method(s) and system(s) for quality evaluation of collaborative text inputs are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

FIG. 1 illustrates a network environment 100 implementing a system 102 for quality evaluation of collaborative text inputs, according to an embodiment of the present subject matter. Herein evaluation of collaborative text inputs refers to a scenario where a text may be sequentially amended and/or revised by a plurality of contributors in a sequence of steps, so that the final output includes contributions and/or revisions from multitude of contributors. Typically, the quality of edits or revision made by a contributor not only depends upon the quality of revisions made by a prior contributor, but is also a function of (i) how hard is the revision to make, and (ii) the quality of the prior revisions made by the other contributors on the same text or page, which are referred to make the current revision. While evaluating the quality of a contribution made by the contributor, also referred herein as 'post-edited submission' (or the quality of a contribution which a contributor may make), the system 102 may consider the following: (i) the quality of the contributor (which can be provided by the worker representation, as discussed later) (ii) the quality of the revision history, for example, translation history in case of a translation scenario, which is represented by the embedding provided by an LSTM network (described later), when a set of all contributors as well as post-edit and sentence features are fed to the LSTM network, and (iii) the difficulty of the revision. In an embodiment, the difficulty of a task can be represented by features that can be extracted from an input data associated with the task. For example, in case the task comprises of translation of a source sentence, the input data may include an input text or sentence from which the text relevant features can be extracted. Thus, the disclosed embodiments evaluate the quality of a contribution made by the contributor based not only on the contributor's quality but also based on the difficulty of task as well as the quality of previous contributions referred to.

In an embodiment, the system 102 may receive an input data associated with a task to be accomplished collaboratively and sequentially by the plurality of contributors. In an embodiment, the input data includes a task-wise data sequence of contributor's post-edit submissions. Herein, the task-wise data sequence of contributors' post-edit submissions refers to the collaborative text inputs provided by a plurality of contributors iteratively in a sequence of steps. The system 102 may be embodied in a computing device, for instance a computing device 104.

Although the present disclosure is explained considering that the system 102 is implemented on a server, it may be understood that the system 102 may also be implemented in a variety of computing systems, such as a laptop computer, a desktop computer, a notebook, a workstation, a cloud-based computing environment and the like. In one implementation, the system 102 may be implemented in a cloud-based environment. It will be understood that the system 102 may be accessed by multiple contributors through one or more user devices 106-1, 106-2 . . . 106-N, collectively referred to as user devices 106 hereinafter, or applications residing on the user devices 106. Examples of the user devices 106 may include, but are not limited to, a portable computer, a personal digital assistant, a handheld device, a Smartphone, a Tablet Computer, a workstation and the like. The user devices 106 are communicatively coupled to the system 102 through a network 108. Herein, the users of the user-devices 106 may include contributors, moderators, and so on.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112. The components and functionalities of the system 102 are described further in detail with reference to FIG. 2.

Figure 2:
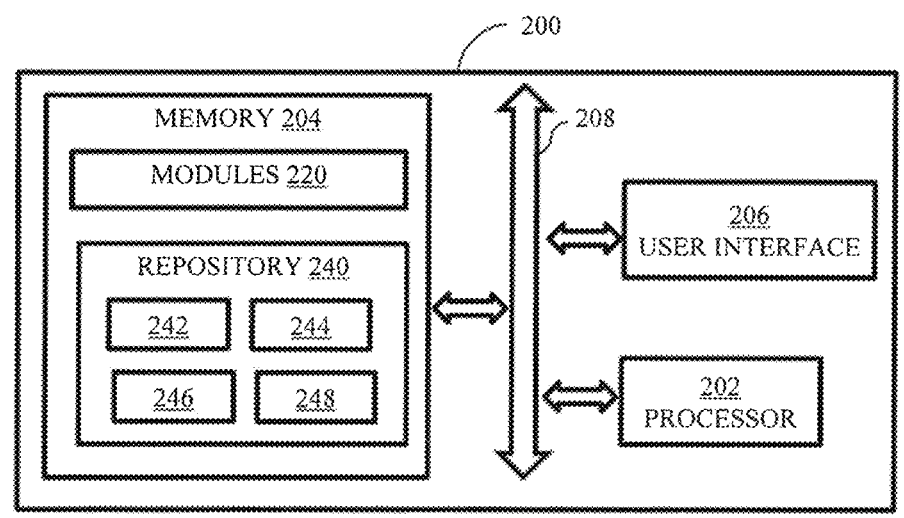
FIG. 2 is a block diagram of a system for quality evaluation of collaborative text inputs according to some embodiments of the present disclosure.

FIG. 2 illustrates a block diagram of a system 200 for quality evaluation of collaborative text inputs, in accordance with an example embodiment. The system 200 may be an example of the system 102 (FIG. 1). In an example embodiment, the system 200 may be embodied in, or is in direct communication with the system, for example the system 102 (FIG. 1).

It will be understood that the system 200 for quality evaluation can be used in various applications, including but not limited to, predicting best of the available submissions for a task that has not been labelled by an expert, determining the acceptance/rejection of contributed work in an online fashion to determine the worker quality, forbidding low-quality workers from attempting further submissions, saving on time and cost, allocating tasks to high-quality workers, and so on.

In an embodiment, the system 200 predicts quality of submissions when the submissions are in the form of free-flowing text or unstructured text data. In accordance, the system 200 utilizes unstructured text data obtained from the submissions as an input. Herein, since the unstructured text data includes iterative post-edit scenarios, the task dependencies can form a long chain-like structure or a sequence. Since the unstructured text data is received from iterative scenarios handled by multiple contributors, said data can be referred to as collaborative text input or collaborative text data.

In an embodiment, the system 200 utilizes (or embodies) an LSTM network that can effectively model the long term dependencies of post-edit submissions through the stateful approach. In particular, the system 200 models post-edit representations and worker (or contributor) representations which affect the quality of the collaboratively modified text, especially for free-flowing textual inputs. Additionally, the system 200 models the post-edit dependencies to predict a binary class in terms of quality improvement of a submission over prior submissions and to evaluate ranks of a series of submissions. The details of modelling the post-edit and worker (or contributor) representations, as well as post-edit dependencies for quality improvement of the submissions are described further in detail in the description below.

The system 200 includes or is otherwise in communication with one or more hardware processors such as a processor 202, at least one memory such as a memory 204, and an I/O interface 206. The processor 202, memory 204, and the I/O interface 206 may be coupled by a system bus such as a system bus 208 or a similar mechanism. The I/O interface 206 may include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types.

The repository 240, amongst other things, includes a system database 242 and other data 244. The other data 244 may include data generated as a result of the execution of one or more modules in the modules 220. The repository 240 is further configured to maintain an input data 246 and training data 248. The details of the input data 246 and training data 248 will be explained further in the description below.

According to the present subject matter, the system 200 facilitates in quality evaluation of collaborative texts. In an embodiment, the system 200 may receive the input data 246 in order to train the system 200 for the quality evaluation. The input data is associated with a task to be accomplished collaboratively and sequentially by a plurality of contributors. The input data includes task-wise data sequence of contributor's post-edit submissions. In an embodiment, the input data may be stored in the repository. Alternatively, the input data may be stored in an external repository, and said external repository may be accessed by the system 200.

The system 200 extracts a plurality of features from the input data. The system 200 may extract the input data from each of the post-edit submissions, and extracts features from the input data. The system 200 constructs a plurality of input sequences based on the plurality of features. Each input sequence includes a plurality of concatenated feature vectors. Each of the concatenated feature vectors includes a post-edit feature vector and a worker representation feature vector. For every post-edit submission, the post-edit feature vector includes an edit vector of a current submission. In an embodiment, the post-edit feature vector is formed by taking ratios of word-wise inserts, deletions and substitutions made by a contributor to the selected parent submission with the total number of words; word length of the source sentence, quantized and normalized time taken by the contributor to perform the task, and average of peer ratings. For every submission, the contributor representation feature vector includes one of one-hot vector encoding of dimensions of a total number of contributors, or learned contributor embedding's by feeding the one-hot-vectors of contributors to a neural network (NN) with a single linear hidden layer. Herein the term contributor's embedding, also referred to as worker embedding, and refers to the lower dimensional representation of the contributor, which serves as a unique identifier for the contributor.

The system 200 models the plurality of input sequences as a LSTM model/network. The LSTM model/network is utilized to train a first binary classifier for quality evaluation of the post-edit submission. In an embodiment, based on the plurality of input sequence, the LSTM model/network predicts a sequence of binary classes, in terms of evaluating if a post-edit submission is an improved version of the prior submissions or not. In an embodiment, the system 200 facilitates in learning the contributors/workers embedding during a training of the LSTM model/network. In an embodiment, the LSTM model is trained with sequential input (where every element in the sequence consists of a combination of post-edit features and worker representation) and sequential output (where every element of the output sequence is binary). Thus, the input sequence is not binary, but the output sequence is binary. Input sequence consists of concatenation of post-edit feature vector and worker representation vector.

In an example scenario, the system 200 trains the LSTM network in a supervised manner, such that the training data is obtained from crowd sourcing scenarios. For example, the contributors 106 may provide textual-post edits, for example, using the system 200. In an embodiment, in order to provide textual post-edit submissions, the contributors (or users of devices 106) may be allowed to access the system 200 and inspect all the machine submissions (for example, translations) for a task (for example, a sentence) and previous crowd contributions. The system 200 allows the contributors to select any of the prior candidate submissions and submit a post-edited version/submission. Herein, the terms post-edit or a post-edited submission refers to a submission received upon being edited by at least one contributor. The contributors rate the prior contributions. The system 200 further enables an expert content moderator to rank the contributions made by the crowd for a subset of tasks. Such a ranking inherently provides information (labels) regarding whether a particular post-edit submission improves upon the previously available contributions/submissions. The ranks and/or labels provided by the expert content moderator acts as training data 248 for training a binary classifier to evaluate and label the post-edited submission.

In an embodiment, the LSTM network trains a second binary classifier to predict a probability of a contributor improving upon prior submissions predicting the probability. In an embodiment, the system 200 trains the LSTM network by mapping a history of prior post-edit submissions into an intermediate embedding, wherein the history of prior post-edit submissions is obtained from the input data. The system 200 then applies output of the LSTM networks and current worker's representation to a neural network (NN), wherein the output of the LSTM networks includes the history embedding's at the last time stamp. The system 200 predicts the probability of a contributor improving upon the prior submissions based on the output of the NN. Said probability is predicted in terms of a binary class, as will be explained further with reference to FIG. 5.

In another embodiment, the system 200 trains an encoder-decoder architecture to predict a sequence of ranks for each of the plurality of sequence of submissions based on the plurality of sequences of concatenated feature vectors. In order to train the encoder-decoder architecture, the system 200 applies the sequence of concatenated feature vectors into the encoder-decoder architecture. The encoder-decoder architecture predicts a sequence of binary labels generated from selected expert provided ranks of the post-edit submissions as ordinal labels. The system 200 obtains, from the encoder, the embedding of the last hidden state which represents the history of post-edit submission. The system 200 feeds the embedding to the decoder which learns the sequence of labels for each time step to provide an output binary sequence. Further, the system 200 calculates ranks based on output binary sequence obtained from the encoder-decoder architecture.

Figure 3:
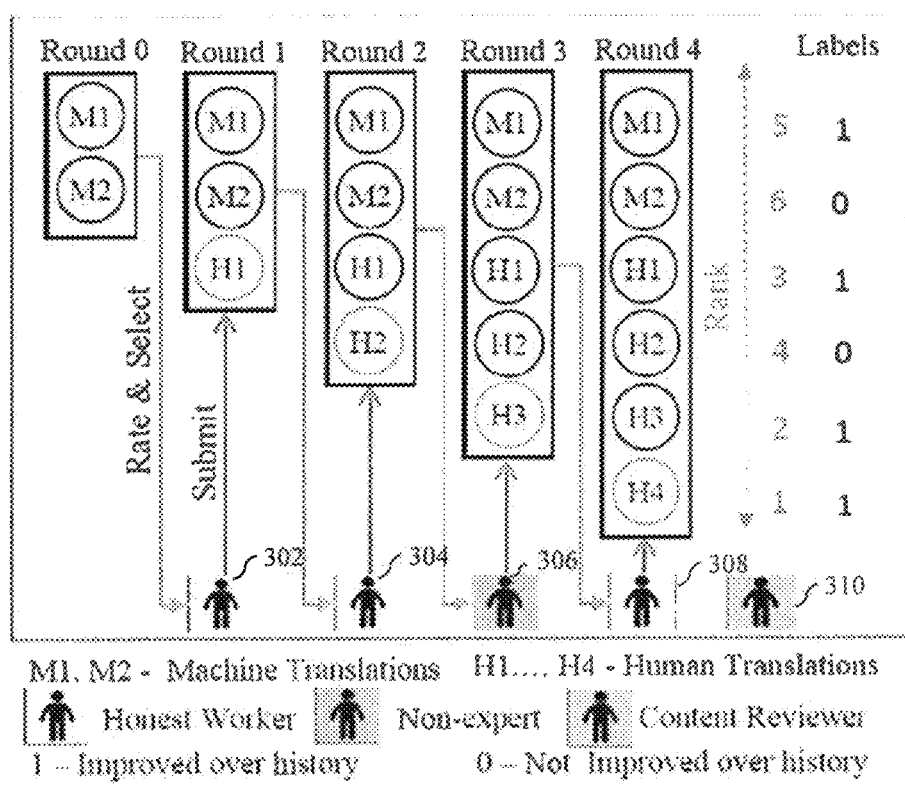
FIG. 3 illustrates an example work-flow for an example task is described in accordance with some embodiments of the present disclosure.

Referring now to FIG. 3, an example work-flow 300 for an example task is described, in accordance with an example embodiment. In the example work-flow 300 illustrated in FIG. 3, a scenario is considered wherein the task includes translating a text, for instance a sentence. Herein, for the ease of understanding of embodiments, the machine submission may be assumed to be a translation obtained from the machine. Additionally, the task may be assumed to be for a sentence. An example screen-shot of the implementation of the workflow for translation use-case is presented in FIG. 4. The screenshot depicted in FIG. 4 pertains to a specific workflow and English to Hindi translation task to illustrate the embodiments of the present disclosure. The proposed approach, however, can be used for any target language, and even tasks such as image captioning, speech transcription, content generation, and so on which may employ collaborative post-editing.

Figure 4:
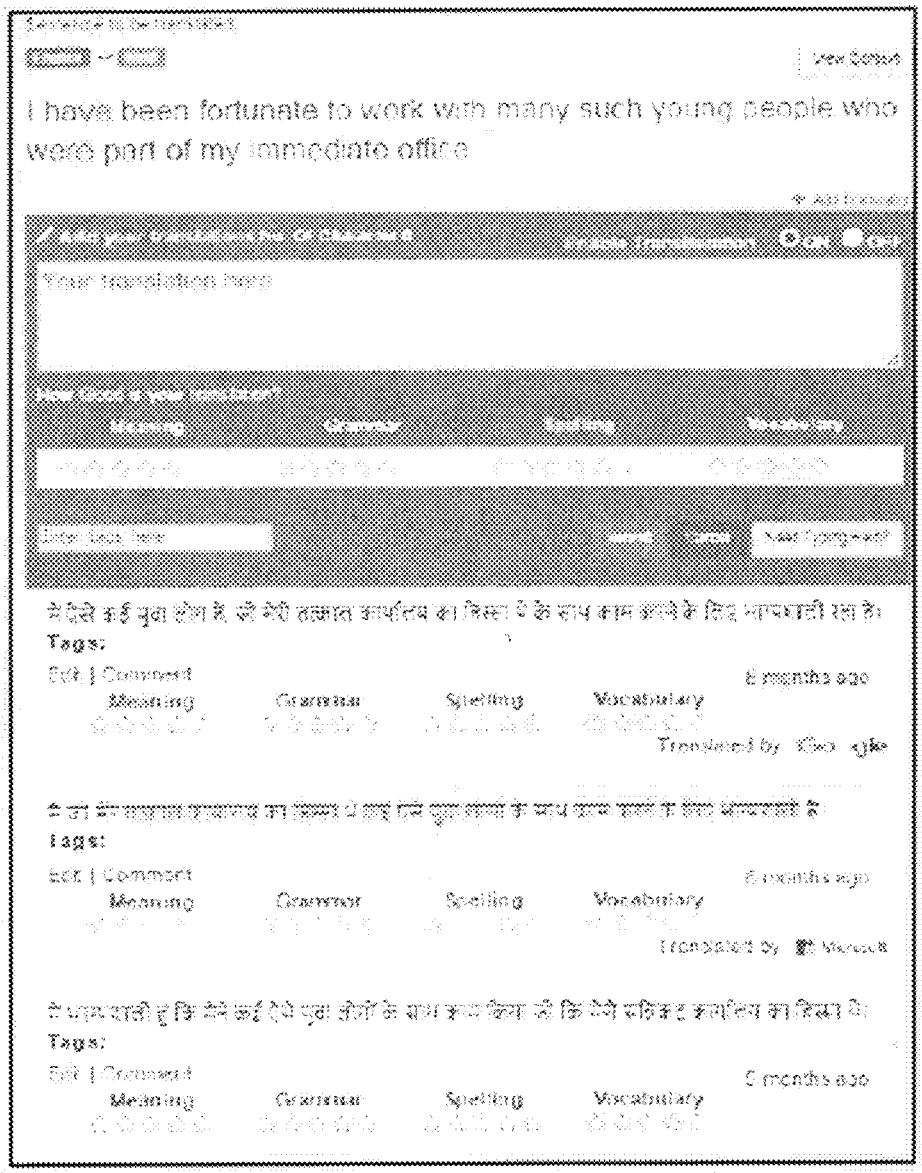
FIG. 4 is an example screen-shot of the implementation of the workflow for the example task (translation use-case) described in FIG. 3 according to some embodiments of the present disclosure.

Referring collectively to FIGS. 3 and 4, the system 200 may provide an interface to the users, for example, crowd workers/contributors, where said crowd workers/contributors can inspect all the machine submissions for said task. Additionally or alternatively, the worker (or the contributor) can view/inspect previous contributions provided by the crowd contributors. Different workers, at different time-steps, can select any of the prior contributions candidates and submit a post-edited version. For example, a worker 302 can select one of the machine submissions, M1 or M2, and submit a post-edited version H1. The workers may rate the prior contributions on a scale of 1 (worst) to 5 (best). Similarly, a worker 304 can select one of the machine-submissions, M1 or M2 or post edit submission H1, and submit a post-edited version, H2. Subsequently, a worker 306 can select one of the submissions, M1 or M2 or H1 or H2, and submit a post-edited version H3. In a similar manner, another worker 308 can select one of the submissions, M1 or M2 or H1 or H2 or H3, and submit a post-edited version H4. The system 200 may enable an expert content moderator or reviewer, for example content reviewer 310 to rank the contributions made by the crowd workers 302, 304, 306, 308 for at least a subset of tasks. Such a ranking inherently provides information (for example, labels) about whether or not a particular post-edit version improves upon the previously available contributions. In this manner the system 200 trains a binary classifier to evaluate quality of post-edit submission. In an embodiment, the binary classifier is trained to determine whether a post-edit submission improves upon the prior submissions for that task. An example flow-diagram of a method for training the binary classifier, for example, a first binary classifier to evaluate quality of the post-edit submission is described further with reference to FIG. 5.

Figure 5:
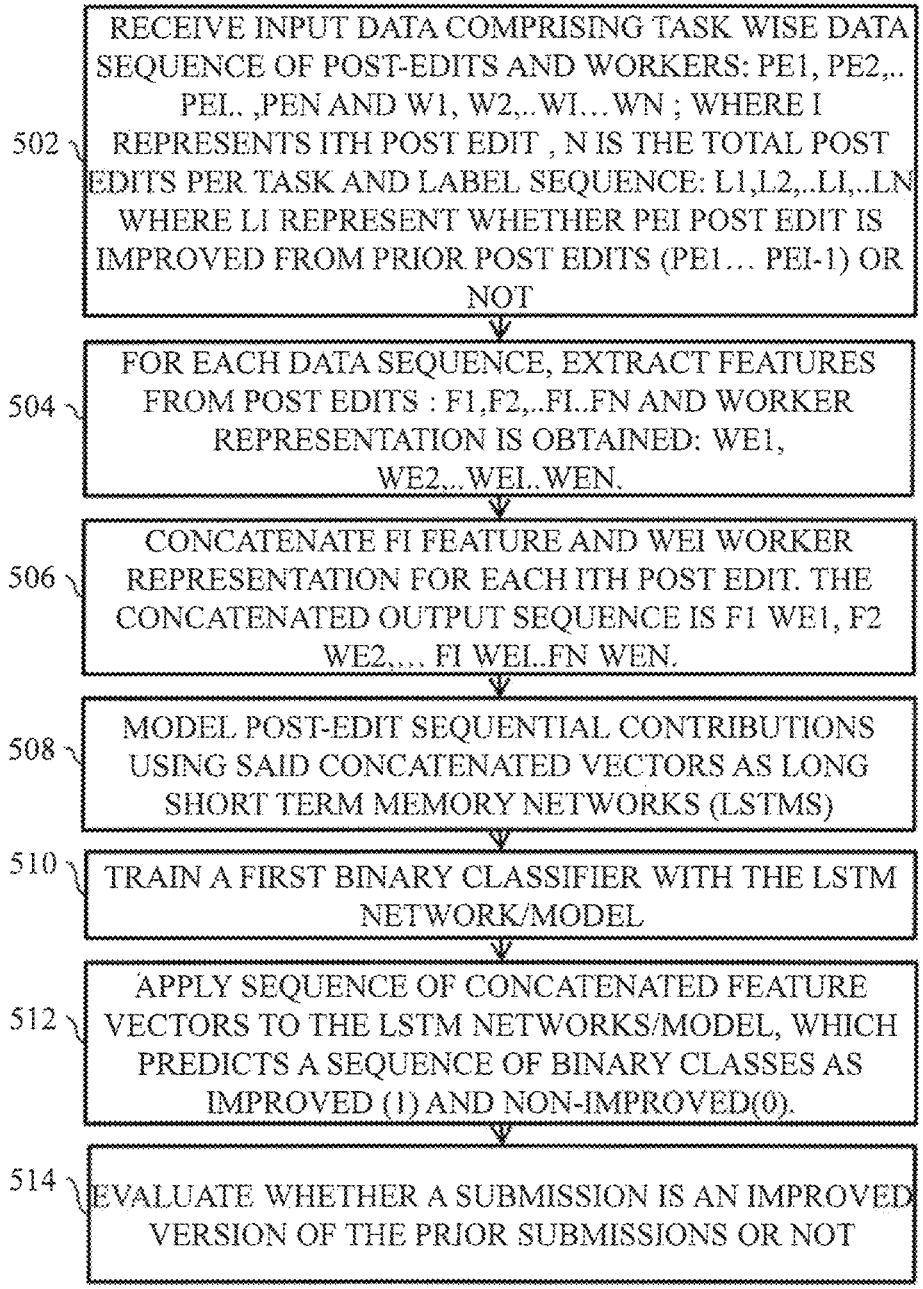
FIG. 5 is a flow diagram of a method for training a binary classifier to evaluate quality of the post-edit submission according to some embodiments of the present disclosure.

Referring now to FIG. 5, a flow diagram of a method 500 for training the first binary classifier to evaluate quality of the post-edit submission is described, in accordance with an example embodiment. The method 500 initiates at 502, where input data 246 is obtained for training the model. The input data 246 includes a task-wise data sequence of post-edit submissions. The task-wise data sequence of the post-edit submissions is represented as $[p_{e1}, p_{e2}, \ldots p_{ei} \ldots, p_{en}]$, and task-wise data sequence of contributors representations is represented as $[w_1, w_2, \ldots w_i \ldots w_n]$;

where i represents $i^{th}$ post edit, n is the total post-edits per task, and

Label sequence: $I_1, I_2, \ldots I_i, \ldots I_n$ where $I_i$ represent whether $p_{ei}$ post-edit is improved from prior post-edits ($p_{e1} \ldots p_{ei-1}$) or not.

At 504, for each data sequence, the system 200 extracts a plurality of features (f1, f2, ... fi ... fn) from the plurality post-edit submissions and contributor representations (we1, we2, ... wei ... wen).

At 506, a plurality of concatenated feature vectors are constructed by combining the extracted features for each $i^{th}$ post-edit. Each of the concatenated feature vectors includes post-edit feature vector $f_i$ and contributor representation vector wei. The concatenated output sequence may be represented as $f_1 w_{e1}, f_2 w_{e2}, fiw_{ei} \ldots fnw_{en}$. In an embodiment, for every translation, the post-edit feature vector includes, for example, edit vector of the current submission that is formed by taking ratios of word-wise inserts, deletes and substitutions made by a worker to the selected parent translation with the total number of words; word length of the source sentence, quantized and normalized time taken by a worker to perform the task, and average of peer ratings. Moreover, for every submission, the contributors' representation feature vector includes one of one-hot vector encoding of the dimensions of the total number of workers, or learned worker embedding's by feeding the one-hot-vectors of contributor to a NN with a single linear hidden layer. Said contributor embedding are learned during the training of the LSTM network and facilitate in dimensionality reduction.

At 508, post-edit collaborative contributions are modelled using said concatenated vectors as Long Short Term Memory networks (LSTMs). At 510, the binary classifiers are trained with the LSTM network. In an embodiment, the LSTM network is a multiple input single output LSTM network. An example of LSTM architecture to determine whether the submission is an improved version of the prior submission or not, is described and explained further with reference to FIG. 6. At 512, the sequence of concatenated feature vectors are applied to the LSTM networks, which predicts a sequence of binary classes as improved (1) and non-improved (0). At 514, it is evaluated whether a submission is an improved version of the prior submissions or not. In an embodiment, the post-edit submission is determined to be improved over all the prior submissions if the first binary classifier determines a binary class as 1, and post-edit submission is determined as not improved if the first binary classifier determines the binary class as 0.

Referring to FIG. 6, an LSTM multi-input single-output architecture 600, with a single layer of LSTM cells, is depicted in accordance with an example embodiment. The LSTM network 600 is capable of evaluating the quality of a post-edit submission made by a worker. In other words the LSTM network 600 may estimate the probability p(yij|xi1, xi2, . . . , xij−1, xij). The quality of a translation is defined by its label yij is conditioned upon of the properties of that submission xij along with the properties of all the prior submissions (xi1, xi2, . . . , xij−1). Following equations demonstrate the mapping defined by the LSTM model. The equations are valid for sequences of all the sentences i.

$$I_j = \tan h(W_{xI}x_j + W_{hI}h_{j-1} + b_I) \quad (1)$$

$$\tilde{C}_j = \sigma(W_{x\tilde{c}}x_j + W_{h\tilde{c}}h_{j-1} + b_{\tilde{c}}) \quad (2)$$

$$F_j = \sigma(W_{xF}x_j + W_{hF}h_{j-1} + b_F) \quad (3)$$

$$O_j = \tan h(W_{xO}x_j + W_{hO}h_{j-1} + b_O) \quad (4)$$

$$c_j = c_{j-1}{}^o F_j + I_j{}^o \tilde{c}_j \quad (5)$$

$$h_j = O_j{}^o \tan hc_j \quad (6)$$

The system 200 exposes the last hidden state of the LSTM network 600. The time-steps are of size of the maximum number of rounds. The data consists of all possible sub-sequences of the sentence post-editing sequences. LSTM network 600 solves the problem by computing the conditional probability by first obtaining the history representation hij of the input (xi1, xi2, . . . , xij−1) given by the last hidden state of the LSTM network 600, and then computing the probability yij using a sigmoid:

$$p(yij|xi1,xi2, \ldots ,xij-1,xij)=p(yij|hij)$$

This LSTM architecture 600 can be further used to determine the best translation for a sentence by identifying the last estimated improvement (label 1) in the label sequence for the sentence.

Herein, an important contribution of the disclosed embodiments is in modelling the contribution of a post-edit in terms of prior-post edits. The post-edit data for a task is the ordered and sequence is obtained which contains post-edit improvements (or versions) made by the workers. Each post-edit version represents the time stamp in the ordered sequence. Thus, the current contribution to the post-edit improvement is learnt from history of prior contributions. In addition to this, the label sequence is constructed from the ranks provided by the experts. For example, in case ranking for 6 post edits of tasks is as 6,5,2,4,1,3 where lower rank is indicative of better quality, then label sequence can be 0,1,1,0,1,0.

In an embodiment, the system 200 is configured to train a second binary classifier to predict quality of a submission a contributor may make. In other words, the system 200 is modelled to predict the probability of a worker improving upon the prior submissions. An example system architecture for training the binary classifier to predict the probability of a worker improving upon the prior submissions is described further with reference to FIG. 7.

Referring now to FIG. 7, example LSTM-NN architecture 700 for training the binary classifier to predict the probability of a worker improving upon the prior submissions, is described in accordance with an example embodiment. The LSTM-NN architecture 700 is a multi-input single-output LSTM-NN architecture.

The LSTM equations for this architecture are same as equations (1) to (6). The last hidden state, which is an output of the equation (6), provides an embedding of the history having the dimensions of the LSTM hidden layer. It is concatenated with the contributor's representation features to feed to a two layered NN. The mathematical representation is as follows:

$$y_{j+1} = \sigma(W_y(ReLU(W_h[h_j, w_j]))) \quad (7)$$

The LSTM time-stamps are of size of (maximum number of rounds−1) with the same number of samples discussed above. LSTM-NN solves the problem by computing the conditional probability by first obtaining the history representation hij−1 of the input:

(xi1, xi2, . . . , xij−1) provided by the last hidden state of the LSTM, and then computing the probability yij by using a sigmoid output of NN with [hij, wj] as an input.

$$p(yij|xi1,xi2, \ldots ,xij-1,wj)=p(yij|hij,wij)$$

Thus, the posterior of this architecture gives the probability with which the contributor can improve the quality of the given history. Aa an application of the disclosed embodiments, post-editing task can be allotted to a (set-of) worker(s) with high estimated probability for the 'improved' prediction.

Here, an important contribution of disclosed embodiments is in modelling the current work improvement probability as a function of prior contributions embedding and current worker representation. In addition to this, the label sequence is constructed from the ranks provided by the experts. For example if there is a ranking for 6 post edits of tasks as 6,5,2,4,1,3 where lower rank is better quality, then label sequence will be 0,1,1,0,1,0.

Further, the system 200 is capable of predicting sequence of ranks from sequence of post edits. In an embodiment, the system 200 is capable of training an encoder-decoder to predict sequence of ranks given a sequence of submissions. An example flow-diagram of predicting sequence of ranks from sequence of post edits, is described with reference to FIG. 8.

Figure 8:
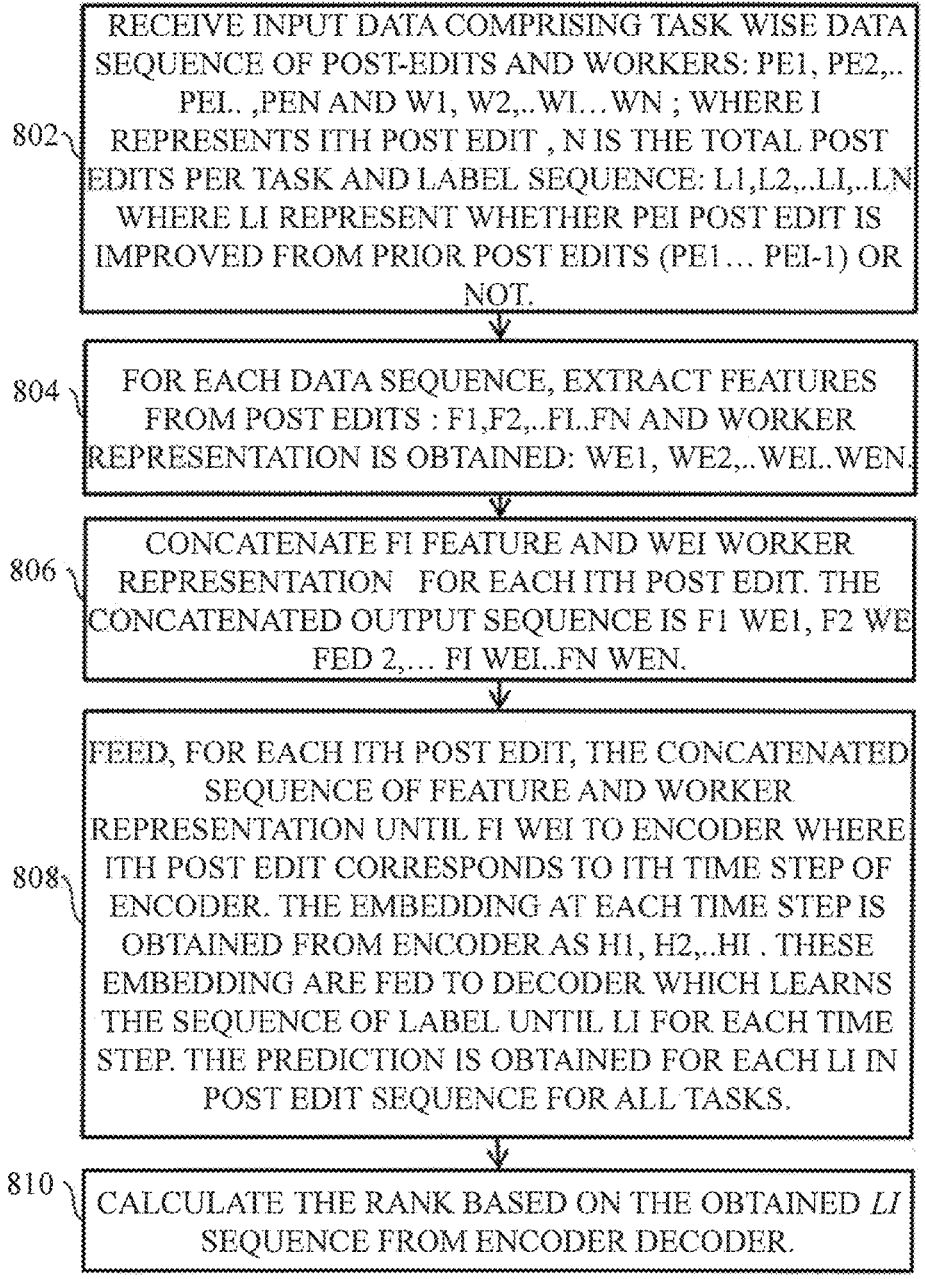
FIG. 8 illustrates an example flow-diagram illustrating a method for predicting sequence of ranks from sequence of post-edits according to some embodiments of the present disclosure.

Referring now to FIG. 8, an example flow-diagram illustrating a method 800 for predicting sequence of ranks from sequence of post-edit submissions, is disclosed in accordance with an example embodiment.

The method 800 initiates at 802, where input data 246 is obtained for training the system/model. The input data includes a task wise data sequence of post-edit submissions. The task wise data sequence of post edits is represented as [$p_{e1}$, $p_{e2}$, . . . $p_{ei}$ . . . , $p_{en}$], and task-wise data sequence of contributors representations is represented as [$w_1$, $w_2$, . . . $w_i$ . . . $w_n$]; where i represents $i^{th}$ post edit, n is the total post edits per task, and Label sequence: $I_1$, $I_2$, . . . $I_i$, . . . $I_n$ where $I_i$ represent whether $p_{ei}$ post edit is improved from prior post edits ($p_{e1}$ . . . $p_{ei-1}$) or not.

At 804, the system 200 extracts a plurality of features (f1, f2, . . . fi . . . fn) from the plurality post-edits and worker representations (we1, we2, . . . wei . . . wen).

At 806, a concatenated feature vector is constructed by combining the extracted features for each $i^{th}$ post-edit. The concatenated vector includes post-edit feature vector $f_i$ and contributors representation vector wei. The concatenated output sequence is $f_1w_{e1}$, $f_2w_{e2}$, fiw$_{ei}$ . . . fnw$_{en}$. In an embodiment, for every translation, the post-edit feature vector includes, for example, edit vector of the current translation that is formed by taking ratios of word-wise inserts, deletes and substitutions made by a worker to the selected parent translation with the total number of words; word length of the source sentence, quantized and normalized time taken by a worker to perform the task, and average of peer ratings. Herein, the edit vector of current translation depicts the amount and nature of edits made by the worker. This captures the free-riding scenario, where most of the translations of a worker are copied, especially the non-improved ones. Honest worker performs less edits on improved translations and vice versa. For machine translations this feature has a value of '−1' depicting it is not a post-edit.

The word length of the source sentence may also be taken as a feature vector. Herein, more complex the sentence is, the workers may tend to perform less edits, which may result into having not much improvement in the quality. The system may quantize and normalize sentence length feature to reduce the variation in the input data, allowing convergence well with lesser available training samples and to bring it to the same scale to that of the edit distance, respectively. An optimum bin size may be determined for best-accuracy.

The time taken in seconds to produce the translation can also be taken as a post-edit feature. Herein, quantized and normalized time taken by a worker to perform the task is taken into consideration. More time taken with less edits or very less time taken with lot of edits can be a scenario of spamming.

Additionally or alternatively, an average peer rating may be considered as a post-edit feature. Every translation may be peer-rated as a part of the workflow. To remove subjectivity, an average of all peer-ratings may be taken, and then the same can be normalized.

Moreover, for every translation, the contributor representation feature vector may include one of one-hot vector encoding of the dimensions of the total number of workers, or learned worker embedding's by feeding the one-hot-vectors of workers to a NN with a single linear hidden layer $w_{ije}=W_1(W_2(w_{ij}))$. These contributor embedding are learned during the training of an LSTM network and help in dimensionality reduction.

At 808, for each $i^{th}$ post-edit, the concatenated sequence of feature and worker representation until $f_iw_{ei}$ is fed to the encoder where $i^{th}$ post-edit corresponds to $i^{th}$ time step of the encoder. The embedding of the last hidden state which represents the history of post-edit is obtained from encoder as h1, h2, . . . hi. This embedding is fed to decoder which learns the sequence of label until for each time step. The prediction is obtained for each li in post edit sequence for all tasks. At 810, rank is calculated based on the obtained li sequence from encoder-decoder.

An important contribution of the disclosed embodiments is in modelling post-edit sequence ranking via Encoder Decoder. Another important contribution of the disclosed embodiments is in rank-computation. For instance, say the label sequence obtained by encoder decoder is 0 0 1 0 0 1, then the $6^{th}$ post-edit is first best contribution from the given post edit submissions and 3rd post edit submission is the second best contribution. So, in this example, depending on number of 1's, k best contributions ranking can be determined.

Example Scenario

In an example scenario, the task includes asking the workers to translate a batch of 6 sentences from English to Hindi, as well as rate the all previous contributions for these sentences. The sentences were selected from a corpus of 1758 English sentences from a book about an autobiography. The maximum rounds of post-edits for any sentence were limited to 4. The batch of 6 was constructed by sampling sentences in the inverse proportion to the contributions already made for the sentence. The same sentence was not allocated twice to the same worker. The crowd consisted of 60 workers. The crowd workers were not professional translators, but employees who were requested to volunteer a few hours everyday. On an average, they worked for 4 hours a day for 17 days (84 hours) to provide us with 6016 post-edits. Thus, along with 3338 machine translations, a total of 9354 translations are obtained.

Figure 9:
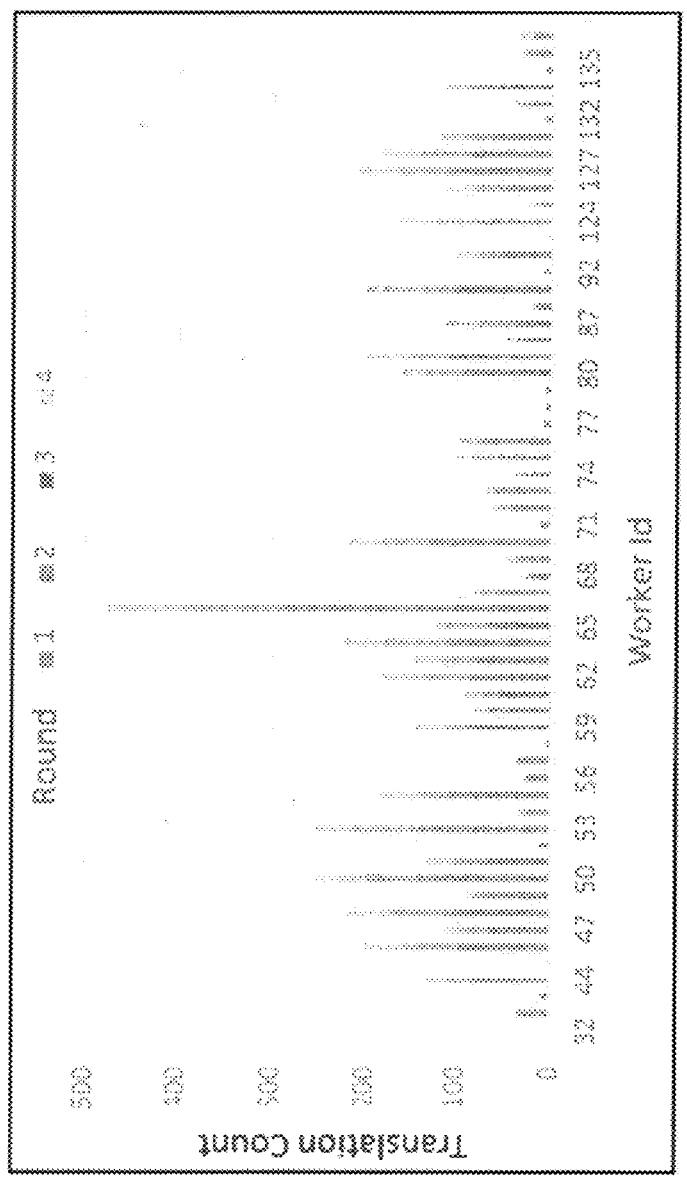
FIG. 9 illustrates a worker-wise count of translations provided by the workers according to some embodiments of the present disclosure.

FIG. 9 illustrates a worker wise count of translations they provided, in accordance with an example scenario. The variations in the graph are due to differences in speed, expertise, time spent and attitude. The translations of 475 sentences (27%) are ranked between 1 to 6 by an expert worker (in-house linguist). In total, there were 3369 ranked human edits, out of which 1465 are labeled to be 1 (improved) and 1904 are labelled to be 0 (not-improved).

The LSTM architecture discussed previously has been tested for distinct settings of features, model hyper parameters and training parameters. The best results were obtained for a 12 dimensional hidden layer with a 20% drop-out, a batch-size of 16 and minimization of cross entropy loss over 1000 epochs. The optimum set of features, for the LSTM model to evaluate the translation quality are: one-hot encoding for the workers, the edit vector and time spent in seconds for a translation. With these features and using 5-fold cross validation, an accuracy of 90.23% is observed. Meanwhile, the addition of sentence word length and average rating as features, provide the best precision 86.89%. The mean of sentence length distribution is 21.8 words with a standard deviation of 10.5 words. The mean of the distribution for time is 20.2 seconds with a standard deviation of 19.9 seconds. The optimum bin size of the quantized sentence word length to give the best accuracy is 10, whereas for time it is 5, which helps in improving the accuracy by 1.33% and precision by 6.4% for sentence length and retaining the accuracy but improving the precision by 4.9% for time.

In order to benchmark the performance, first the utility of the peer-ratings is evaluated. With average peer-ratings, labels were generated for the translations using the method discussed earlier for ranking. By comparing these labels with the ranking labels an accuracy of 56.9% is obtained. To capture the collaborative nature of the problem, the LSTM setup with only rating as a feature is used. With 5-fold cross validation, an improved accuracy of 69.75% is obtained. This showcases that peer-ratings by themselves are not good enough for translation quality predictions. In order to further setup a benchmark, a non-collaborative single layer neural network classifier is implemented. Classification is performed by taking into consideration all set of features to receive an accuracy of 76.26%.

Finally, this result is benchmarked with the Page-rank HITS based unsupervised approach by applying this technique on the data. This approach makes use of cosine similarity between all possible pairs of translations for score computations and thus does not capture the multi-round post-edit dependencies. With these scores a translation is labelled as improved if the score is more than all the prior submissions. By comparing these labels with the rank labels an accuracy of 55.86% is obtained. The superior performance of the recurrent models as compared to a single layer neural network and the unsupervised approach, clearly underlines the effectiveness of collaborative models for post-edits. Consequently, RNN is also investigated by exactly following the LSTM architecture to get 85.93% accuracy. This shows LSTMs capture the post-edit dependencies better than RNN.

It is observed that the LSTM model with feature vector consisting of only the one-hot worker representation has the accuracy of 83.88%, making it the most contributing feature. The learned worker embedding of 4 and 12 dimensions provide the accuracy of 82.55% and 83.56%; showcasing only 1.33% and 0.31% drop respectively, with a very high reduction in dimensionality. Thus, embedding provide good lower dimensional representation for workers.

The frequency with which the LSTM model can find the nth best translation is also identified, by identifying the last post-edit that improved translation (predicted as 1). The LSTM model allows predicting the best translation with 92.11% frequency. We benchmark this result with the Pagerank HITS. The number of highest scored translations providing nth rank is computed, as the frequency to determine the nth best translation. With this approach the best translation with the frequency of 19.01%. The single layer NN classifier predicts the best translation with the frequency of 58.63% which is less than the LSTM based approach.

With the LSTM-NN architecture it is also predicted whether a contributor would provide improvement with an accuracy of 88.78%. The LSTM architecture with only worker encoding, or with the sentence length as a feature, can also be used for such a purpose. These models or systems provide accuracy of 83.88% and 86.29%, respectively, which is lesser than that of LSTM-NN. The higher performance of LSTM-NN architecture can be attributed to the improved embedding of the history based upon all features. These implementations proved that recurrent neural networks, in particular LSTMs, are able to effectively model post-editing interdependencies. The performance gains over state of the art non-sequential approaches are significant.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for quality evaluation of collaborative text input, comprising:
   receiving, via one or more hardware processors, an input data associated with a task to be accomplished collaboratively and sequentially by a plurality of contributors, the input data comprising task-wise data sequence of contributor's post-edit submissions;
   extracting a plurality of features from the input data, via the one or more hardware processors;
   constructing, via the one or more hardware processors, a plurality of input sequences based on the plurality of features, an input sequence of the plurality of input sequences comprising a plurality of concatenated feature vectors, each of the concatenated feature vectors comprising a post-edit feature vector and a contributor representation feature vector; and
   modelling, via the one or more hardware processors, the plurality of input sequences as a Long Short Term Memory (LSTM) network, wherein the LSTM network is utilized to train a first binary classifier for quality evaluation of the post-edit submission.

2. The method of claim 1, wherein the post-edit submission is determined to be improved over prior post-edit submissions if the first binary classifier determines a binary class as 1, and post-edit submission is determined not to be improved if the first binary classifier determines the binary class as 0.

3. The method of claim 1, wherein the task comprises a translation of text, for each post-edit submission, the post-edit feature vector comprises an edit vector of a current submission, and wherein the post-edit feature vector comprises of ratios of word-wise inserts, deletions and substitutions made by a contributor to a selected parent submission with total number of words, word length of a source sentence associated with the task, and quantized and normalized time taken by the contributor to perform the task.

4. The method of claim 1, wherein for every post-edit submission, the contributor representation feature vector comprises one of one-hot vector encoding of dimensions of total number of contributors and learned contributor embedding by feeding the one-hot-vectors associated with the contributors to a neural network (NN) with a single linear hidden layer.

5. The method of claim 4, further comprising learning the contributor embedding during the training of the LSTM network.

6. The method of claim 1, further comprising training a second binary classifier, by the LSTM network to predict a probability of a contributor improving upon prior submissions.

7. The method of claim 6, wherein predicting the probability comprises:

mapping a history of prior post-edit submissions into an intermediate embedding, the history of prior post-edit submissions obtained from the input data;

applying output of the LSTM networks and current contributor embedding to a neural network (NN), wherein the output of the LSTM networks comprises the history embedding at the last time stamp; and predicting the probability of a contributor improving upon the prior submissions based on the output of the NN.

8. The method of claim 1, further comprising training an encoder-decoder architecture to predict sequence of ranks for each of the plurality of sequence of submissions based on the plurality of sequences of the concatenated feature vectors.

9. The method of claim 8, wherein training the encoder-decoder architecture comprises:

applying the sequence of concatenated feature vectors into the encoder-decoder architecture, the encoder-decoder architecture predicts a sequence of binary labels generated from selected expert provided ranks of the post-edit submissions as ordinal labels;

obtaining, from the encoder, the embedding of the last hidden state which represents the history of post-edit;

feeding the embedding to the decoder which learns the sequence of binary labels for each time step to provide a binary sequence; and calculating ranks based on the binary sequence obtained from the encoder-decoder.

10. A system for quality evaluation of collaborative text input, the system comprising:

at least one memory storing instructions; and one or more hardware processors coupled to said at least one memory, wherein said one or more hardware processors are configured by said instructions to:

receive an input data associated with a task to be accomplished collaboratively and sequentially by a plurality of contributors, the input data comprising task-wise data sequence of contributor's post-edit submissions;

extract a plurality of features from the input data;

construct a plurality of input sequences based on the plurality of features, an input sequence of the plurality of input sequences comprising a plurality of concatenated feature vectors, each of the concatenated feature vectors comprising a post-edit feature vector and a contributor representation feature vector; and model the plurality of input sequences as a Long Short Term Memory (LSTM) network, wherein the LSTM network is utilized to train a first binary classifier for quality evaluation of the post-edit submission.

11. The system of claim 10, wherein the one or more hardware processors are configured by the instructions to determine if the post-edit submission is improved over prior post-edit submissions when the first binary classifier determines a binary class as 1, and determines the post-edit submission not to be improved when the first binary classifier determines the binary class as 0.

12. The system of claim 10, wherein the task comprises a translation of text, for every post-edit submission, the post-edit feature vector comprises an edit vector of a current submission, and wherein the post-edit feature vector comprises of ratios of word-wise inserts, deletions and substitutions made by a contributor to a selected parent submission with total number of words; word length of a source sentence, associated with the task, and quantized and normalized time taken by the contributor to perform the task.

13. The system of claim 10, wherein for every post-edit submission, the contributor representation feature vector comprises one of one-hot vector encoding of dimensions of total number of contributors and learned contributor embedding by feeding the one-hot-vectors associated with the contributors to a neural network (NN) with a single linear hidden layer.

14. The system of claim 13, wherein the one or more hardware processors are configured by the instructions to learn the contributor embedding during the training of the LSTM network.

15. The system of claim 10, wherein the one or more hardware processors are configured by the instructions to train a second binary classifier, by the LSTM network to predict a probability of a contributor improving upon prior submissions.

16. The system of claim 15, wherein to predict the probability, the one or more hardware processors are configured by the instructions to:

map a history of prior post-edit submissions into an intermediate embedding, the history of prior post-edit submissions obtained from the input data;

apply output of the LSTM networks and current contributor embedding to a neural network (NN), wherein the output of the LSTM networks comprises the history embedding at the last time stamp; and predict the probability of a contributor improving upon the prior submissions based on the output of the NN.

17. The system of claim 10, wherein the one or more hardware processors are configured by the instructions to train an encoder-decoder architecture to predict sequence of ranks for each of the plurality of sequence of submissions based on the plurality of sequences of the concatenated feature vectors.

18. The system of claim 17, wherein to train the encoder-decoder architecture, the one or more hardware processors are configured by the instructions to:

apply the sequence of concatenated feature vectors into the encoder-decoder architecture, the encoder-decoder architecture predicts a sequence of binary labels generated from selected expert provided ranks of the post-edit submissions as ordinal labels;

obtain, from the encoder, the embedding of the last hidden state which represents the history of post-edit;

feed the embedding to the decoder which learns the sequence of binary labels for each time step to provide a binary sequence; and calculate ranks based on the binary sequence obtained from the encoder-decoder.

19. A non-transitory computer-readable medium having embodied thereon a computer program for executing a method for quality evaluation of collaborative text input, the method comprising:

receiving, via one or more hardware processors, an input data associated with a task to be accomplished collaboratively and sequentially by a plurality of contributors, the input data comprising task-wise data sequence of contributor's post-edit submissions;

extracting a plurality of features from the input data, via the one or more hardware processors;

constructing, via the one or more hardware processors, a plurality of input sequences based on the plurality of features, an input sequence of the plurality of input sequences comprising a plurality of concatenated feature vectors, each of the concatenated feature vectors comprising a post-edit feature vector and a contributor representation feature vector; and modelling, via the one or more hardware processors, the plurality of input sequences as a Long Short Term Memory (LSTM) network, wherein the LSTM network is utilized to train a first binary classifier for quality evaluation of the post-edit submission.

* * * * *